United States Patent [19]

Arendt

[11] Patent Number: 4,759,387

[45] Date of Patent: Jul. 26, 1988

[54] PULSATION ABSORBING DEVICE

[75] Inventor: Edward Arendt, Palatine, Ill.

[73] Assignee: Wilkes-McLean, Ltd., Barrington, Ill.

[21] Appl. No.: 37,027

[22] Filed: Apr. 10, 1987

[51] Int. Cl.$^4$ ............................................... F15B 1/04
[52] U.S. Cl. ...................................... 138/30; 138/42; 138/43
[58] Field of Search ...................... 138/26, 30, 42, 43; 220/85 B; 73/707; 137/207, 593

[56] References Cited

U.S. PATENT DOCUMENTS

| | | |
|---|---|---|
| 2,760,518 | 8/1956 | Peet ........................................ 138/30 |
| 2,841,181 | 1/1958 | Hewitt et al. . |
| 3,380,480 | 4/1968 | Bleasdale . |
| 3,744,527 | 7/1973 | Mercier . |
| 3,948,287 | 4/1976 | Sugimura et al. . |
| 4,020,872 | 5/1977 | Sugimura et al. . |
| 4,059,125 | 11/1977 | Sugimura et al. . |
| 4,287,916 | 9/1981 | Sugimura et al. . |
| 4,335,751 | 6/1982 | Sugimura et al. . |
| 4,431,200 | 2/1984 | Sugimura . |
| 4,526,205 | 7/1985 | Sugimura et al. . |
| 4,628,964 | 12/1986 | Sugimura et al. ...................... 138/30 |

FOREIGN PATENT DOCUMENTS 1249197 10/1971 United Kingdom ................... 138/30

Primary Examiner—Bryant, III: James E.
Attorney, Agent, or Firm—Wood, Dalton, Phillips, Mason & Rowe

[57] ABSTRACT

A pulsation absorbing device and method of making a pulsation absorbing device is disclosed. The pulsation absorbing device includes a pressure vessel having a resilient diaphragm mounted therein together with an inlet associated with one end of the pressure vessel and an outlet associated with the other end of the pressure vessel. A spool is mounted within the pressure vessel inwardly of the resilient diaphragm and intermediate and in communication with the inlet and the outlet to carry fluid from the inlet to the outlet. The spool and the resilient diaphragm define a pressure chamber therebetween which is in fluid communication with fluid carried from the inlet to the outlet through holes in the spool. A helical wave band is disposed on the spool for accommodating flow through the holes in the spool and defines a plurality of helically spaced flow accommodating openings. With this arrangement, at least some of the flow accommodating openings of the helical wave band are in communication with the holes in the spool after the helical wave band has been spirally wound upon the spool in accordance with the disclosed method.

12 Claims, 2 Drawing Sheets

PULSATION ABSORBING DEVICE

FIELD OF THE INVENTION

The present invention relates to a fluid pressure device utilized in hydraulic systems and, more particularly, to a pulsation absorbing device and a method of making a pulsation absorbing device.

Generally speaking, pulsation absorbing devices are used for the purpose of dampening pulses and suppressing shocks in hydraulic systems. Such devices can include a cylindrical pressure vessel having a resilient diaphragm or bladder therein together with a valve extending through the pressure vessel for charging the pressure chamber defined between the diaphragm and wall of the pressure vessel with a gas such as nitrogen. With this arrangement, pulses and shocks in the hydraulic system act against the resilient diaphragm in opposition to the nitrogen charged pressure chamber.

With pulsation absorbing devices of this type, it is possible to replace bladder type accumulators many times their size. In fact, line size alone determines the size of the pulsation absorbing devices required for a given application. Despite this advantage, there have been problems encountered in some instances with pulsation absorbing devices of the type described.

Before describing the problems encountered, it should be noted that pulsation absorbing devices are conventionally charged with nitrogen at a percentage of the minimum hydraulic operating pressure. If the hydraulic fluid is oil, the oil has a free and unrestricted flow path through a tube extending between an inlet and an outlet and through radial holes in the tube which serves to act against the diaphragm or bladder on the side opposite that which has been subjected to the nitrogen charge. As hydraulic shock or pulses occur, the diaphragm expands against the nitrogen charge, thus absorbing the shock or pulse to protect the hydraulic system.

Unfortunately, such pulsation absorbing devices have commonly utilized moving valving components between the tube and resilient diaphragm. This is potentially detrimental in two respects, i.e., slow response time due to the time required for the valving components to open and close and potential damage to the resilient diaphragm in the presence of extreme pulses and/or shocks should the diaphragm be drawn into the valving components or the holes through the tube. Accordingly, it has remained to provide a pulsation absorbing device having no moving parts while functioning in a fully effective manner.

While not limited to any specific application, one important application is hydraulic circuits for devices adapted to send shock waves down through the earth to be reflected off underground strata for mapping purposes. Specifically, such a pulsation absorbing device is quite important for the equipment utilized in the seismic exploration for oil and in other hydraulic circuits which are subject to high pressure shock waves where a suppressor or pulsation absorbing device is essential to prevent the circuit piping and other equipment from being damaged or destroyed. For years, such exploration required a vibrating device mounted on a truck whereby steel prongs were forced into the ground using the weight of the truck to cause the penetration after which the prongs were vibrated rapidly to send sound waves downward to be reflected off underground strata.

The present invention is directed to overcoming the above stated problems and accomplishing the stated objects by providing an improved pulsation absorbing device and method for making a pulsation absorbing device.

SUMMARY OF THE INVENTION

Accordingly, the present invention is directed to a pulsation absorbing device having a pressure vessel with a resilient diaphragm mounted therein together with inlet means associated with one end of the pressure vessel and outlet means associated with the other end of the pressure vessel. A spool means is mounted within the pressure vessel inwardly of the resilient diaphragm and is disposed intermediate and in communication with the inlet means and the outlet means to carry fluid from the inlet means to the outlet means. The spool means and the resilient diaphragm define a pressure chamber therebetween which is in fluid communication with fluid carried from the inlet means to the outlet means through openings in the spool means. A helical wave band is disposed on the spool means for accommodating flow through the openings in the spool means and defines a plurality of helically spaced flow accommodating openings. With this arrangement, at least some of the flow accommodating openings of the helical wave band are in communication with the openings in the spool means to absorb, i.e., dampen and suppress, any pulses and shocks in a hydraulic system.

In an exemplary embodiment, the inlet means is an inlet fitting defining an inlet and is adapted to be mounted in one end of the pressure vessel and the outlet means is an outlet fitting defining an outlet and is adapted to be mounted in the other end of the pressure vessel. Also, the spool means is preferably a spool having inner and outer surfaces with the openings comprising a plurality of spaced holes extending through the inner and outer surfaces. Additionally, the spool, resilient diaphragm, and pressure vessel are all preferably cylindrical and disposed in generally coaxial relation.

More specifically, the helical wave band is preferably formed from a spring material to have axially adjacent crests in alignment. The axially adjacent crests define the flow accommodating openings and are compressible to reduce the spacing therebetween. As a result, the flow accommodating openings are of variable size depending upon compression of the helical wave band.

In the exemplary embodiment, the helical wave band is formed to have axially adjacent crests and troughs in alignment. Further, the helical wave band preferably has spirally adjacent crests and troughs spaced by an angle other than an even multiple of 360°. In particular, the helical wave band is preferably formed such that corresponding spirally adjacent crests and troughs are spaced by an angle on the order of 80°.

Still more specifically, the pulsation absorbing device advantageously includes a sleeve having a plurality of openings disposed on the helical wave band on the side opposite the spool. The cooperation of the sleeve and helical wave band is such that the resilient diaphragm cannot act directly against the helical wave band which might otherwise cause it to move or compress after assembly to thereby present openings large enough to cause the resilient diaphragm to extrude causing damage thereto. With this arrangement, at least some of the flow accommodating openings of the helical wave band are in direct fluid communication with the openings in the sleeve.

In addition, the present invention is directed to a method of making a pulsation absorbing device. The method includes the step of providing a pressure vessel, a resilient diaphragm, a spool having openings therein, and a helical wave band defining a plurality of helically spaced flow accommodating openings. After providing these components, the method includes the step of placing one end of the helical wave band on the spool and thereafter imparting relative rotation therebetween to spirally wind the helical wave band onto the spool following which the resilient diaphragm and the spool and helical wave band are mounted within the pressure vessel. In this connection, the spool and helical wave band are mounted within the pressure vessel inwardly of the resilient diaphragm to define a pressure chamber therebetween.

Other objects, advantages and features of the present invention will become apparent from the following specification taken in conjunction with the accompanying drawings.

DETAILED DESCRIPTION OF THE PREFERRED EMBODIMENTS

Figure 1:
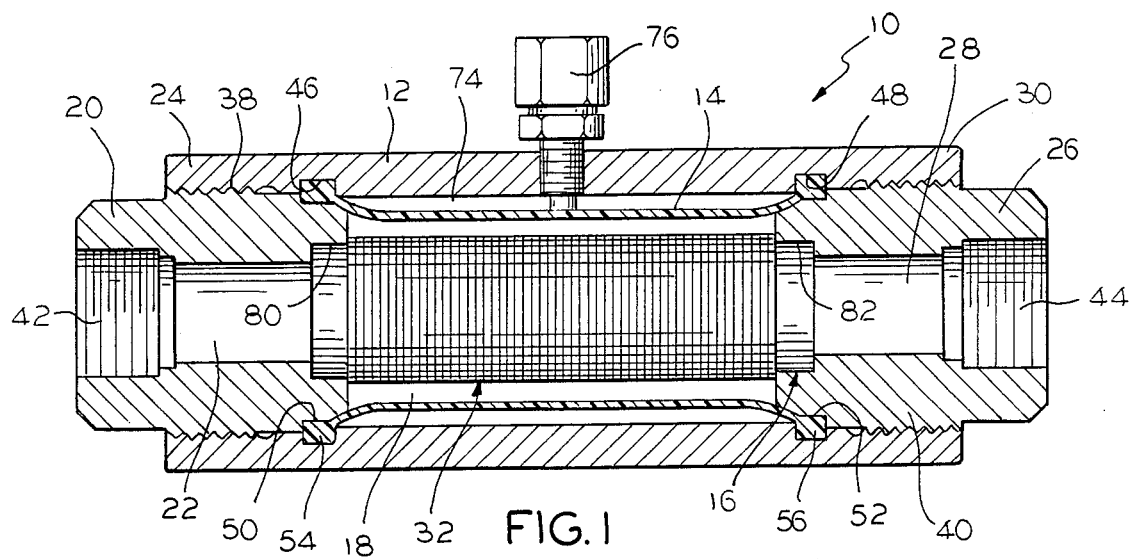
FIG. 1 is a cross-sectional view of a pulsation absorbing device in accordance with the present invention.

An exemplary embodiment of a pulsation absorbing device in accordance with the invention is illustrated in FIG. 1. The pulsation absorbing device 10 includes a pressure vessel 12 having a resilient diaphragm 14 mounted therein, and a spool generally designated 16 (see, also, FIG. 2) is mounted within the pressure vessel 12 inwardly of the resilient diaphragm 14. With this construction, the spool 16 and the resilient diaphragm 14 define an expansible pressure chamber 18 therebetween.

Still referring to FIG. 1, the pulsation absorbing device 10 includes inlet means and outlet means. More specifically, the inlet means comprises an inlet fitting 20 defining an inlet 22 associated with one end 24 of the pressure vessel 12 and the outlet means comprises an outlet fitting 26 defining an outlet 28 associated with the other end 30 of the pressure vessel 12. As shown, the spool 16 is disposed intermediate and in communicating engagement with the inlet fitting 20 and the outlet fitting 26 to carry fluid from the inlet 22 to the outlet 28.

Figure 2:
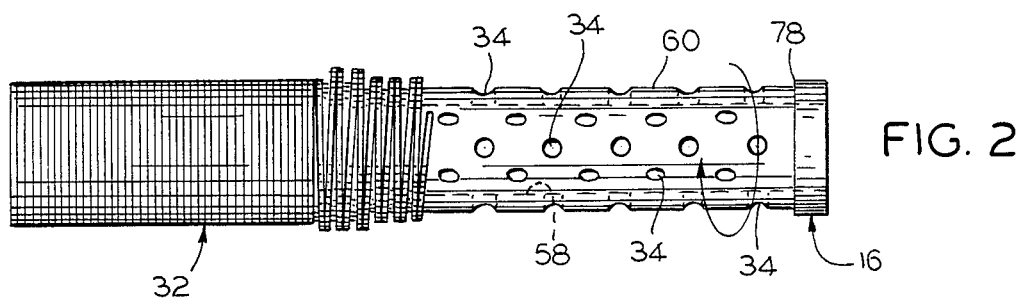
FIG. 2 is a side elevational view illustrating the helical wave band being placed on the spool of the pulsation absorbing device of FIG. 1.
Figure 3:
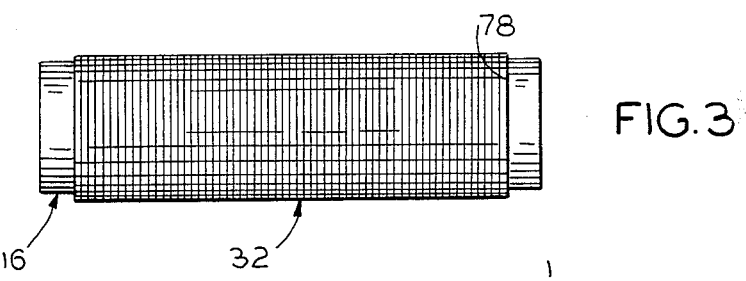
FIG. 3 is a side elevational view after the helical wave band has been placed on the spool of the pulsation absorbing device FIG. 1.
Figure 4:
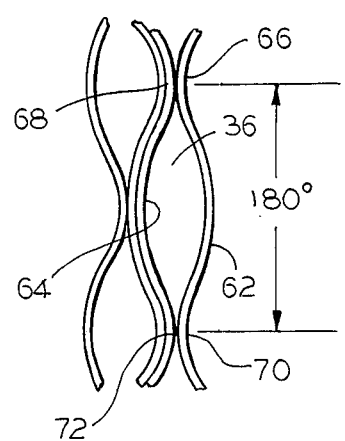
FIG. 4 is a schematic view illustrating the relationship between axially adjacent crests and spirally adjacent troughs of the helical wave band.

Referring to FIGS. 1 through 3, a helical wave band 32 is disposed on the spool 16 for accommodating flow through openings 34 therein. The helical wave band 32 defines a plurality of helically spaced flow accommodating openings 36 (see FIG. 4) with at least one of the flow accommodating openings 36 of the helical wave band 32 being partly or completely in direct fluid communication with each of the openings or holes 34 in the spool 16, the latter of which are circumferentially offset in axially adjacent rows as shown in FIG. 2. As a result, the pressure chamber 18 is in fluid communication with fluid carried from the inlet 22 to the outlet 28 through the holes 34 and the openings 36.

Referring to FIG. 1, it will be appreciated that the inlet fitting 20 is adapted to be mounted in the one end 24 of the pressure vessel 12 by means of mating threads as at 38 and the outlet fitting 26 is adapted to be mounted in the other end 30 of the pressure vessel 12 by means of mating threads as at 40. It will also be seen that both the inlet fitting 20 and the outlet fitting 26 have internal threads as at 42 and 44, respectively, for a threaded connection to piping of a hydraulic circuit or the like. Moreover, as shown in FIG. 1, the inlet fitting 20 and the outlet fitting 26 cooperate to secure the opposing ends of the resilient diaphragm 14 and the spool 16 in fixed positions within the pressure vessel 12.

More specifically, the pressure vessel 12 preferably has a circumferential groove 46 spaced inwardly of the mating threads as at 38 near the end 24 thereof and the pressure vessel 12 also has a circumferential groove 48 spaced inwardly of the mating threads as at 40 near the end thereof. It will also be seen that both the inlet fitting 20 and the outlet fitting 26 have radial undercuts 50 and 52, respectively, on their inner ends adapted to be disposed in opposed relation to the grooves 46 and 48, respectively. With this arrangement, the diaphragm 14 is formed with a circumferential enlargement 54 adapted to be disposed in confined relation between the circumferential groove 46 and the radial undercut 50 and the resilient diaphragm 14 has a circumferential enlargement 56 adapted to be disposed in confined relation between the circumferential groove 48 and the radial undercut 52.

Once again referring to FIG. 2, it will be seen that the spool 16 has inner and outer surfaces 58 and 60, respectively. It will also be seen that the openings 34 comprise a plurality of circumferentially and axially spaced holes extending through the inner and outer surfaces 58 and 60. More particularly, the openings or holes 34 are disposed in planes transverse to the axis of the spool 16 and are circumferentially staggered in adjacent transverse planes.

As shown in FIGS. 1 through 3, the spool 16, the resilient diaphragm 14, and the pressure vessel 12 are all generally cylindrical. It will also be appreciated that the inner and outer surfaces 58 and 60 of the spool 16 are generally cylindrical. Moreover, as shown, the spool 16, the resilient diaphragm 14, and the pressure vessel 12 are disposed in generally coaxial relation.

Preferably, the helical wave band 32 is formed from a spring material to have aligned axially adjacent crests 62 and 64. The aligned axially adjacent crests 62 and 64 define the flow accommodating openings 36 and are compressible due to the spring material utilized for the helical wave band 32 to reduce the spacing therebetween, i.e., the spacing between the aligned axially adjacent crests 62 and 64. As a result, the flow accommodating openings 36 are of variable size depending upon compression of the helical wave band 32.

As mentioned, the helical wave band 32 is formed to have axially adjacent crests 62 and 64 in alignment. The axially adjacent troughs such as 66 and 68 and 70 and 72, respectively (see FIG. 4) are also in alignment. Moreover, the helical wave band 32 is formed to have spirally adjacent crests and spirally adjacent troughs spaced by an angle other than an even multiple of 360°.

Referring once again to FIG. 1, the resilient diaphragm 14 is mounted relative to the pressure vessel 12 to define a second pressure chamber 74 therebetween. The pressure vessel 12 also includes means such as the valve 76 for pressurizing the second pressure chamber 74 to a selected pressure for opposing fluid pressure in the generally cylindrical pressure chamber 18. In particular, the second pressure chamber 74 can be pressurized with a gas such as nitrogen.

As suggested hereinabove, the spool 16 is generally concentric with the pressure vessel 12 and the resilient diaphragm 14 and has generally cylindrical and coaxial inner and outer surfaces 58 and 60. Similarly, the inlet fitting 20 and inlet 22 and the outlet fitting 26 and outlet 28 are disposed in generally concentric and coaxial relation to the other components of the pulsation absorbing device 10.

As mentioned, the axially adjacent crests 62 and 64 define variable flow accommodating openings 36 and are compressible to reduce the spacing therebetween. The flow accommodating openings 36 are thereby of variable size depending upon compression of the helical wave band 32. Since the spool 16 includes a radially outwardly extending shoulder such as 78 at each end thereof, the helical wave band 32 can be compressed between the shoulders such as 78.

With this form of spool 16, the helical wave band 32 is of a length selected for sufficient compression for a predetermined size for the variable flow accommodating openings 36. The variable flow accommodating openings 36 can, thus, vary between the uncompressed size in which the axially adjacent troughs such as 66, 68 and 70, 72 are just in contact with one another to a fully compressed condition in which the crests 62 and 64 are near or in contact with one another. As a result, by selecting the length of the helical wave band 32, the size of the variable flow accommodating openings 36 can be controlled.

Figure 5:
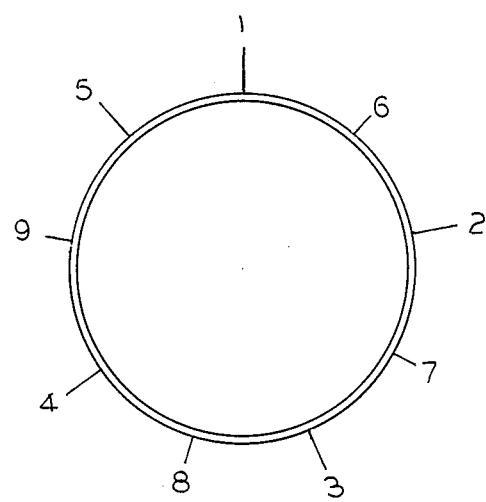
FIG. 5 is a schematic representation of the relative position of spirally adjacent crests and troughs of the helical wave band.

Referring to FIG. 5, the spacing of spirally adjacent crests and troughs can be understood. It has previously been mentioned that it is desirable for spirally adjacent crests and troughs to be spaced by an angle other than an even multiple of 360°, e.g., 4½ crests for each 360°. With this spacing, the spirally adjacent crests and troughs are spaced by an angle on the order of 80°.

If so constructed, the crests in axially adjacent rows will be spirally offset with respect to one another. In addition, by utilizing an offset of 80°, the crests of one row correspond with the troughs of the next adjacent row, i.e., crests numbered 1 through 5 will be offset by 40° relative to crests numbered 6 through 10. With the variable flow accommodating openings 36 so spaced, a pair of crests fits in close conformity with troughs in adjacent rows (see FIG. 4).

Figure 6:
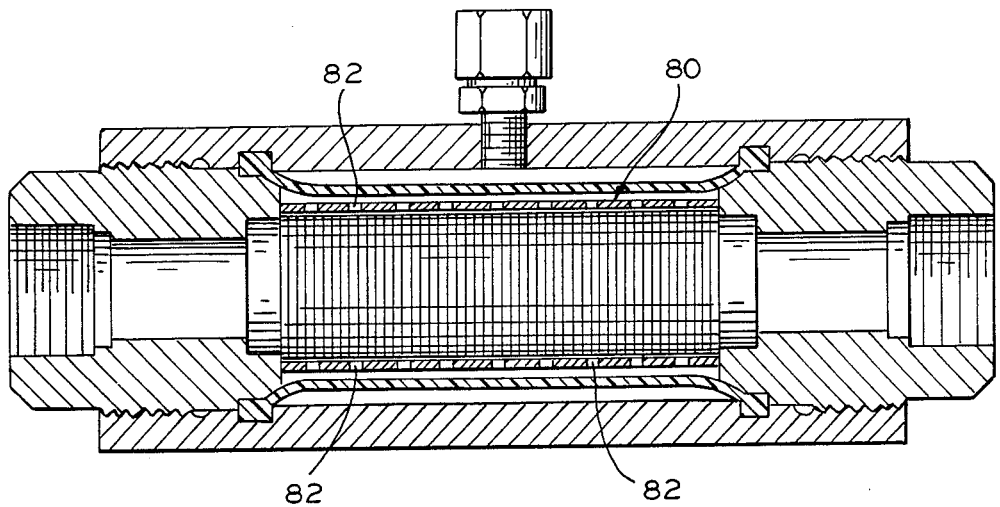
FIG. 6 is a cross-sectional view similar to FIG. 1 but utilizing a perforated sleeve disposed over the helical wave band.
Figure 7:
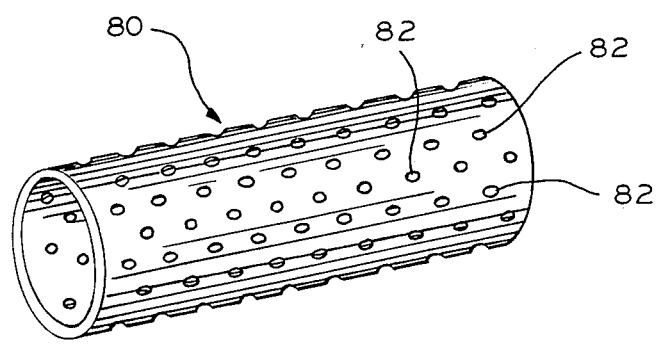
FIG. 7 is a perspective view of the perforated sleeve illustrated in FIG. 6.

Referring to FIGS. 6 and 7, the pulsation absorbing device 10 advantageously includes a sleeve 80 having a plurality of openings 82 disposed on the helical wave band 32 on the side opposite the spool 16. The cooperation of the perforated sleeve 80 (which has the openings 82 circumferentially offset in axially adjacent rows) and the helical wave band 32 is such that the resilient diaphragm 14 cannot act directly against the helical wave band 32 which might otherwise cause it to move or compress after assembly to thereby present openings large enough to cause the resilient diaphragm 14 to extrude causing damage thereto. The sleeve 80 may be of quite thin metal material incapable of retaining its shape like the much sturdier spool 60 with its relatively thick metal wall. The sleeve 80 is supported against deformation by the wave band and its function is to provide openings 82 for oil flow with less restriction than provided by the wave band itself yet provide individual openings so small that diaphragm damage will not occur. With this arrangement, at least some of the flow accommodating openings 36 of the helical wave band 32 are in direct fluid communication with the openings 82 in the sleeve 80.

In accordance with the present invention, the method of forming a pulsation absorbing device includes the step of providing a pressure vessel 12, a resilient diaphragm 14, a spool 16 having openings 34 therein, and a helical wave band 32 defining a plurality of helically spaced flow accommodating openings 36. Next, one end of the helical wave band 32 is placed on the spool 16 (see FIG. 2) and thereafter relative rotation is imparted therebetween to spirally wind the helical wave band 32 onto the spool 16, after which the resilient diaphragm 14 and the spool 16 and helical wave band 32 are mounted within the pressure vessel 12. Specifically, the spool 16 and helical wave band 32 are mounted within the pressure vessel 12 inwardly of the resilient diaphragm 14 to define a pressure chamber 18 therebetween.

In addition, the spool 16 is disposed intermediate and in communicating engagement with the inlet 22 and the outlet 28 associated with the opposite ends 24 and 30 of the pressure vessel 12 with the shoulders such as 78 disposed within enlarged counter bores 80 and 82 in the inwardly facing ends of the inlet fitting 20 and the outlet fitting 26. The pressure chamber 18 is in fluid communication with the inlet 22 and the outlet 28 through the openings 34 in the spool 16. By selecting the length of the helical wave band 32 for sufficient compression for a predetermined fixed size for the variable flow accommodating openings 36, it is possible to carefully control the operation of the pulsation absorbing device 10.

While not shown in the drawings, it will be appreciated that the spool 16 can take other forms. It is possible, for instance, for the spool 16 to comprise a pair of axially spaced collars such as 78 into which a plurality of rods extending therebetween can be threaded. With this arrangement, the helical wave band 32 can be threaded into a position between the collars where it will be supported on the rods.

While in the foregoing there have been set forth preferred embodiments of the invention, it is to be understood that the invention is only to be limited by the spirit and scope of the appended claims.

I claim:

1. A pulsation absorbing device, comprising:
a pressure vessel having a resilient diaphragm mounted therein;
inlet means associated with one end of said pressure vessel and outlet means associated with the other end of said pressure vessel;
spool means mounted within said pressure vessel inwardly of said resilient diaphragm, said spool means being disposed intermediate and in communication with said inlet means and said outlet means to carry fluid from said inlet means to said outlet means, said spool means and said resilient diaphragm defining a pressure chamber therebetween;

said spool means having a plurality of openings therethrough and said pressure chamber being in fluid communication with fluid carried from said inlet means to said outlet means through said openings in said spool means; and a helical wave band disposed on said spool means to accommodate flow through said openings in said spool means, said helical wave band defining a plurality of helically spaced flow accommodating openings, at least some of said flow accommodating openings of said helical wave band being in direct fluid communication with said openings in said spool means;

said helical wave band being formed from a spring material having substantially regularly spaced and alternately crests and troughs in a plane substantially perpendicular to the longitudinal axis of the spool means with axially adjacent crests in alignment said troughs being axially adjacent and in contact with each other, said axially adjacent crests defining said flow accommodating openings and being compressible to reduce the spacing therebetween, said flow accommodating openings being of variable size depending upon compression of said helical wave band.

2. The pulsation absorbing device as defined by claim 1 wherein said inlet means is an inlet fitting defining an inlet and adapted to be mounted in one end of said pressure vessel and said outlet means is an outlet fitting defining an outlet and adapted to be mounted in the other end of said pressure vessel.

3. The pulsation absorbing device as defined by claim 1 wherein said spool means is a spool-having inner and outer surfaces, said openings comprising a plurality of spaced holes extending through said inner and outer surfaces.

4. The pulsation absorbing device as defined by claim 3 wherein said spool, resilient diaphragm, and pressure vessel are all generally cylindrical, said inner and outer surfaces of said spool also being generally cylindrical, said spool, resilient diaphragm, and pressure vessel being disposed in generally coaxial relation.

5. The pulsation absorbing device as defined by claim 1 wherein said helical wave band is also formed to have axially adjacent crests and troughs in alignment, said helical wave band being formed to have spirally adjacent crests and troughs spaced by an angle other than an even multiple of 360°.

6. The pulsation absorbing device as defined by claim 1 including a sleeve disposed on said helical wave band opposite said spool means, said sleeve having a plurality of openings therein, at least some of said flow accommodating openings of said helical wave band being in direct fluid communication with said openings in said sleeve.

7. A pulsation absorbing device, comprising:

a cylindrical pressure vessel having a resilient cylindrical diaphragm mounted therein;

an inlet fitting defining an inlet associated with one end of said pressure vessel and an outlet fitting defining an outlet associated with the other end of said pressure vessel;

a cylindrical spool mounted within said pressure vessel inwardly of said resilient diaphragm, said spool being disposed intermediate and in communicating engagement with said inlet fitting and said outlet and being generally concentric with said pressure vessel and said resilient diaphragm, said spool and said resilient diaphragm defining a generally cylindrical expansible pressure chamber therebetween;

said spool having generally cylindrical and coaxial inner and outer surfaces and having a plurality of circumferentially and axially spaced holes therethrough, said pressure chamber being in fluid communication with fluid carried from said inlet to said outlet through said circumferentially and axially spaced holes in said spool;

a helical wave band disposed on said spool means for accommodating flow through said circumferentially and axially spaced holes in said spool, said helical wave band defining a plurality of helically spaced variable flow accommodating openings, at least some of said variable flow accommodating openings of said helical wave band being in communication with said circumferentially and axially spaced holes in said spool;

said helical wave band being formed from a spring material having substantially regularly spaced and alternately crests and troughs in a plane substantially perpendicular to the longitudinal axis of the spool means with axially adjacent crests in alignment said troughs being axially adjacent and in contact with each other, said axially adjacent crests defining said variable flow accommodating openings and being compressible to reduce the spacing therebetween, said variable flow accommodating openings thereby being of variable size depending upon compression of said helical wave band; and a sleeve having a plurality of openings disposed on said helical wave band, at least some of said flow accommodating openings of said helical wave band being in direct fluid communication with said openings in said sleeve.

8. The pulsation absorbing device as defined by claim 7 wherein said resilient diaphragm is mounted relative to said pressure vessel to define a second pressure chamber therebetween, said pressure vessel including means for pressurizing said second pressure chamber to a selected pressure for opposing fluid pressure in said cylindrical expansible pressure chamber.

9. The pulsation absorbing device as defined by claim 7 wherein said inlet fitting is adapted to be threaded into one end of said pressure vessel, said inlet fitting also cooperating to secure one end of said resilient diaphragm and one end of said spool within said pressure vessel, said outlet fitting being adapted to be threaded into the opposite end of said pressure vessel, said outlet fitting also cooperating to secure the other end of said resilient diaphragm and the other end of said spool within said pressure vessel.

10. The pulsation absorbing device as defined by claim 7 wherein said spool includes a radially outwardly extending shoulder at each end thereof, said helical wave band being disposed between said radially outwardly extending shoulders, said helical wave band being of a length selected for sufficient compression for a predetermined fixed size for said variable flow accommodating openings.

11. The pulsation absorbing device as defined by claim 8 wherein said helical wave band is formed to have axially adjacent crests and troughs in alignment, said helical wave band being formed to have spirally adjacent crests and troughs spaced by an angle other than an even multiple of 360°.

12. The pulsation absorbing device as defined by claim 11 wherein said spirally adjacent crests and troughs are spaced by an angle on the order of 80 .

* * * * *